(12) United States Patent
Barde

(10) Patent No.: US 8,761,187 B2
(45) Date of Patent: Jun. 24, 2014

(54) SYSTEM AND METHOD FOR AN IN-SERVER VIRTUAL SWITCH

(75) Inventor: Kaushik C. Barde, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 236 days.

(21) Appl. No.: 13/159,968

(22) Filed: Jun. 14, 2011

(65) Prior Publication Data
US 2012/0324442 A1    Dec. 20, 2012

(51) Int. Cl.
*H04L 12/28* (2006.01)
*H04L 12/50* (2006.01)

(52) U.S. Cl.
USPC .......................................... 370/409; 370/386

(58) Field of Classification Search
None
See application file for complete search history.

(56) References Cited

U.S. PATENT DOCUMENTS

| | | | |
|---|---|---|---|
| 2006/0277346 A1* | 12/2006 | Doak et al. | 710/305 |
| 2008/0123676 A1* | 5/2008 | Cummings et al. | 370/419 |
| 2008/0162800 A1* | 7/2008 | Takashige et al. | 711/104 |
| 2010/0054260 A1* | 3/2010 | Pandey et al. | 370/395.53 |
| 2012/0063299 A1* | 3/2012 | Narasimhan et al. | 370/218 |
| 2012/0246637 A1* | 9/2012 | Kreeger et al. | 718/1 |
| 2012/0317311 A1* | 12/2012 | Arakawa et al. | 710/3 |

OTHER PUBLICATIONS

Casado, M. et al., "Virtualizing the Network Forwarding Plane," Proceedings of the Workshop on Programmable Routers for Extensible Services of Tomorrow, Nov. 30, 2010, 6 pages.
"Cisco VN-Link: Virtualization-Aware Networking," White Paper, 2009, pp. 1-8, Cisco Systems, Inc.
"Intel® 82576 Gigabit Ethernet Controller, High-performance, Dual-Port Gigavit Network Connectivity for multi-core and virtualized platforms," Product Brief, 4 pages.
"OpenFlow Switch Specification," Feb. 28, 2011, pp. 1-56, Version 1.1.0 Implemented (Wire Protocol 0x02).
Santos, J. R., et al., "Bridging the Gap between Software and Hardware Techniques for I/O Virtualization," USENIX Annual Technical Conference, 2008, pp. 29-42, USENIX Association.
"Intel® 82599 10 GbE Controller," Datasheet, Apr. 2011, pp. 1-200, 322429-008, Revision No. 2.7.
"Intel® 82599 10 GbE Controller," Datasheet, Apr. 2011, pp. 201-400, 322429-008, Revision No. 2.7.
"Intel® 82599 10 GbE Controller," Datasheet, Apr. 2011, pp. 401-600, 322429-008, Revision No. 2.7.
"Intel® 82599 10 GbE Controller," Datasheet, Apr. 2011, pp. 601-848, 322429-008, Revision No. 2.7.

* cited by examiner

*Primary Examiner* — Ayaz Sheikh
*Assistant Examiner* — Sori Aga
(74) *Attorney, Agent, or Firm* — Slater & Matsil, L.L.P.

(57) ABSTRACT

In accordance with an embodiment, a data processing system includes a processor, a memory, and an interface port configured to be coupled to a hardware network interface device. The processor is configured to run a process that maps network switching functions of each of a plurality of virtual machines to the hardware network interface device.

32 Claims, 8 Drawing Sheets

| | | |
|---|---|---|
| API ACCESS 306 | API ACCESS FOR V.VLAN PARAMETERS, IVDS INSTANCE LIFE CYCLE, vPort TO vNIC ASSIGNMENTS, vNIC AND PHYSICAL NIC LINE-SPEED, STATUS AND ERROR, ACL, vPort MIRRORING, SPAN/RSPAN/ERSPAN FOR PORT MONITORING | |
| 304 VIRTUAL SWITCH ACCESS | V.VLAN ACCESS: TAGGING PER HOST VLAN, vMAC PER vNIC, vMAC FUNCTION GENERATION PER PHYSICAL MAC, vNIC TO vPort MAPPING | ACCESS AND RULES FOR DATA PLACE ACL, FLOW TABLE, vPort POOL, vPort MIRRORING, |
| 302 BASE HW ACCESS | LOW LEVEL MAPPINGS OF NIC FUNCTIONS: (INTERRUPT, Tx/Rx QUEUE AND PACKET SWITCHING REGISTER ACCESS, PCI-e CONFIG SPACE) | Xen HYPERVISOR MMIO/DMA/ INTERRUPT SETUP FOR NIC, EPT OPTIMIZATION INTERRUPT MAPPING FOR LINE SPEED/STATUS |

*FIG. 4*

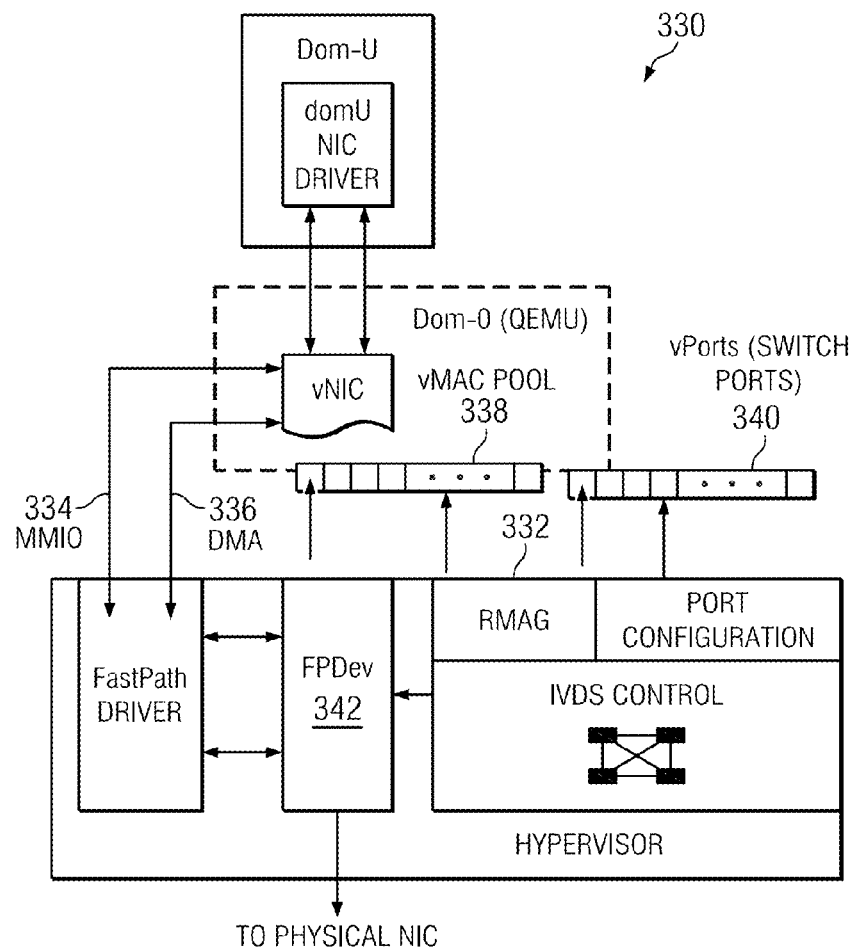

*FIG. 5*

SYSTEM AND METHOD FOR AN IN-SERVER VIRTUAL SWITCH

TECHNICAL FIELD

The present invention relates to computer servers, and, in particular embodiments, to a system and method for an in-server virtual switch.

BACKGROUND

Virtualization technology's emergence as a core Infrastructure as a Service (IaaS) backbone for variety of cloud deployments is well-known. Over the period of last 10 years, advances in x86 hardware assists have paved the way for performance and scalability focused virtualization solutions. Hypervisors, otherwise known as Virtual Machine Monitors (VMM), employ software instruction intercept mechanisms to emulate CPU, memory & I/O resources to allow for operating systems (OS) to run as guests. Properly written VMM can provide reliable, secure & accurate virtual systemic view to the guest OS. This is used to leverage modern architectural features of recent operating systems running under a virtualized hardware view. Server virtualization can be further classified into compute, network and storage virtualizations.

Many advances in CPU and memory virtualization techniques have enabled guest operating systems to run efficiently on virtualized hardware. Innovations in compute virtualization techniques are mainly in the CPU and memory related hardware virtualization assists as well as in their software leverage points in Hypervisors. Network virtualization plays a major role in defining inter-VM network behavior. Virtualization based IaaS often mimics existing Datacenter internetworking assumptions and defines new virtual inter-networking paradigms. Typical Virtual inter-networking involves three types of functional elements, namely virtual NICs, virtual network elements, such as L2 switches, and virtual to physical packet flow. Virtual NICs are presented as an emulated device or SR-IOV mapped PCI virtual function. Virtual Network elements and flow management are typically exposed as a "Virtual Switch."

Traditionally, non-virtualized server-side switching has four layers. The first layer is a core layer that handles Layer-2 (L2) switching backplanes. This includes storage (through director switches) and server network switches. L2 switches are where a server network interface card (NIC) connects. The second layer is an aggregation layer that includes an aggregator switch that takes care of distinct L2 switch interconnection. The third layer includes control functions for ACL, VLAN configuration, and the fourth layer includes Layer-4 through 7 switches for load balancing, address translation, firewall, BI/DPI functions etc. In a nut-shell, each physical server and applications running on those servers are bonded to 1 or more NIC cards, NICs connect to L2 or L3 or L4-L7 switches for layered internetworking operations.

The virtualized switching plane plays a major role in the convergence of existing core physical inter-networking layers with new inter-VM networking abstractions. A smoother transition to virtualization based inter-networking warrants proper "plumbing" of physical inter-networking functions with a virtual machine layer. Ethernet switch networking vendors are providing external "Virtualization-aware" switching solutions. Most of these exist, however, as an external switch. On the other side, NIC card vendors are implementing in-hardware virtualization assists such as virtual machine device queues (VMD) or single-root I/O virtualization (SR-IOV) for virtual machine (VM) assigned data flow and IEEE 801.2 layer-2 switching capabilities. Although few proposals have been made to make "Edge Switching" seem more attractive for next generation data centers including hints of leveraging NIC features for TSO (TCP Segmentation Offload), checksum/GRE/IPSec offloading, these proposals do not elaborate on techniques on just how to leverage these "offloaded" features.

SUMMARY OF THE INVENTION

In accordance with an embodiment, a data processing system includes a processor, a memory, and an interface port configured to be coupled to a hardware network interface device. The processor is configured to run a process that maps network switching functions of each of a plurality of virtual machines to the hardware network interface device.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 2 illustrates embodiment SIFT features in active regions on video frames;

FIG. 4 illustrates an embodiment IVDS control plane responsibility stack.

FIG. 5 illustrates an embodiment relationship between HW NIC functions for MMIO, DMA, vMAC, vPort and VM;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In a prior art nominal or non-virtualized machine, when an application sends out data, the data is sent through the kernel or user space of the operating system. A driver then performs an I/O control operation that fills buffers into the NIC's queue, and the NIC's queue essentially takes those buffers, and the network processor running pushes them out to the network. On the other hand, in a virtualized scenario, a similar scenario exists, since one of the purposes of virtualization is to consolidate an operation, yet keep the sanctity of this operation in tact. When the DMA operation occurs in a prior art system, a parallel virtualization occurs, in which the driver is modified within the virtual machine to essentially map real memory used by the network process running on the NIC. A piece of that memory is exposed directly though a grant mechanism to manage the domain.

In an embodiment implementation, the grant mechanism is bypassed such that queues that are represented by these columns and rows are essentially the addresses associated with those, and are directly fixed up through this control plane set up mechanism. Therefore, when the network driver performs a TX/RX activity, it directly goes to the network processor's view of the queue.

In an embodiment, a virtual switch approach creates a virtual switch abstraction within hypervisor layer by uniquely arranging hardware-based L2 offload functions and extends manageability for virtual machine (VM) inter-networking. Embodiments of the present invention include mapping networking hardware, such as network interface cards (NICs), to support switch functions as a virtual switch interface, as well as the ability to partition control and data plane activities in hypervisor and privilege guest OS running on top of systems including, but not limited to Huawei's Accelerated Netpath. In one exemplary embodiment, a Xen Hypervisor and a dom-0 Linux as privileged guest is used, however, it should be appreciated that many embodiment solution are hypervisor agnostic, hence other hypervisors could alternatively be used.

Figure 1:
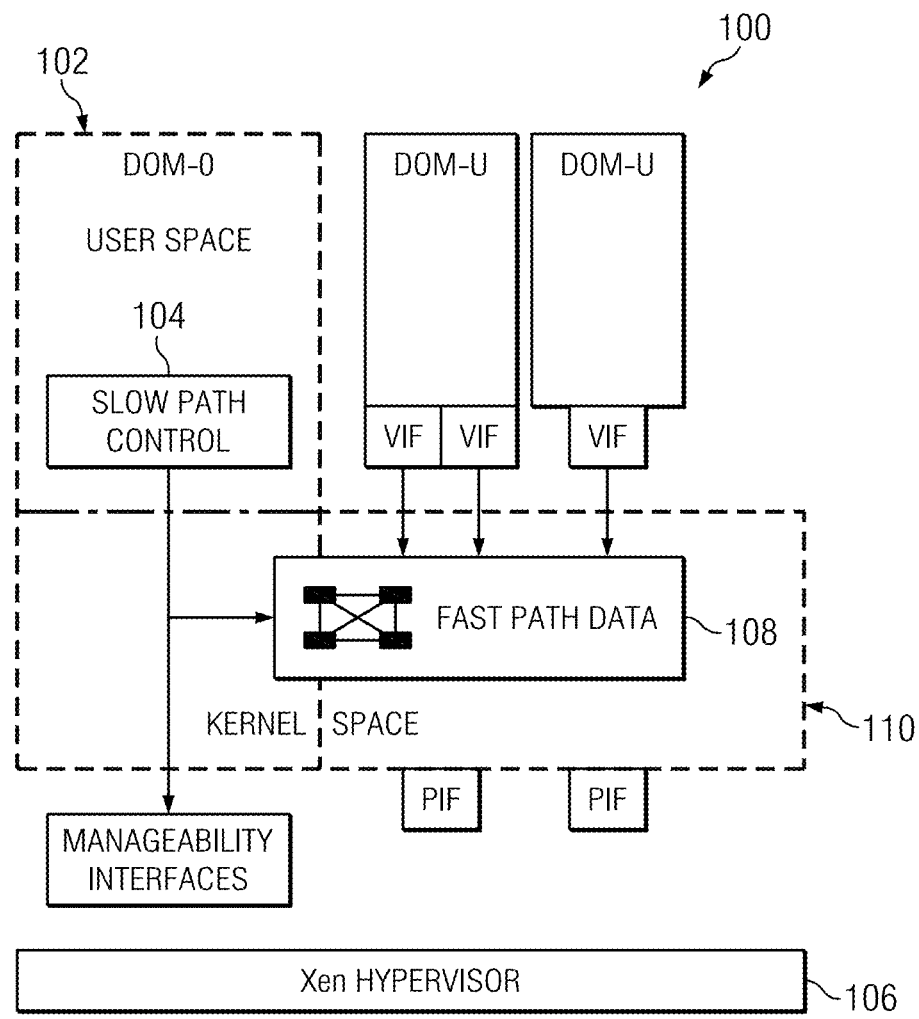
FIG. 1 illustrates a prior art Open vSwitch virtual switch architecture.

FIG. 1 illustrates a block diagram of prior art Open vSwitch architecture 100 that is primarily geared towards exporting fine grained forwarding interfaces for controlling packet QoS, filter and tunneling in a virtualized setup. It also facilitates migration of network state per VM, which is a common problem for VM migration. Open vSwitch creates software partitioning for control and data plane operations as fast path 108 and slow path. The slow path is implemented in user space and fast path is in the kernel space of dom-0 102 or hypervisor 106. Although, most implementations such as Xen/KVM leverage control/management domain, the hypervisor does not support process concepts or multi-threading. The vSwitch user space control interface supports configuration functions such as forwarding logic, VLAN specific virtual switch creation, virtual NIC interface bonding per VM per virtual port and load balancing virtual interfaces with a physical NIC. It also implements interfaces to support remote flow visibility mechanisms such as NetFlow/OpenFlow.

Fast path 108 is kept simple and implemented in kernel space 110. It is responsible for simple packet forwarding as per MAC learning table. The data path is platform specific but implemented inside the control domain's kernel component. Open vSwitch primarily targets Linux based virtualization platform and hence, emulated Virtual Distributed Ethernet and Linux Bridge interface functions are implemented as easy "drop-in" candidate for existing Linux Bridge or VDE implementations. Open vSwitch implementation remains flexible of leveraging Hardware Accelerated Forwarding in VMDQ capable NICs by offloading data path to HW, however no specific techniques are proposed to date. The block diagram of FIG. 1 shows Open vSwitch architecture in Xen configuration using Xen hypervisor 106. Here, the vSwitch replaces existing Xen bridge infrastructure in dom-0 102 with user space and kernel mode modules.

The slow path constitutes configuration and connectivity management. The configuration interface resides in the management domain part of hypervisor (Xen dom-0 102 for example). Switch control functionality such as: ACL, ports profile/mirroring (SPAN/RSPAN), application of QoS policy per virtual interface, MAC learning and load-balancing over bonded interfaces is included. In addition to basic virtual port to VIF binding and remote configuration management, Open vSwitch aggregates a switching plane for the overall virtual environment. Slow path control 104 also implements remote configuration for external flow management protocols such as OpenFlow, NetFlow, sFlow, as well as, remote manageability protocols such as SNMP.

Open vSwitch implements fast path data 108 forwarding in kernel-space 110 of the Xen dom-0 102. This includes a flow table data structure used for per-packet lookup, modification to real world binding, and a forwarding function. It also maintains a counter for forwarding table entries. Fast path code is about 3000 lines of code and deliberately kept smaller, in some cases, to minimize overheads in packet forwarding. Some proposals, such as those described in Nicera, *Virtualizing the Network Forwarding Plane*, ACM PRESTO 2010, Nov. 30, 2010, which is incorporated by reference, herein, stipulates pushing of fast path in the silicon. Such an approach would have slow path (in s/w and in management domain) and would program data path forwarding silicon to directly perform packet TX/RX activities with corresponding VMs. The Intel® DPDK (Data Plane Developer Kit) proposes such a move with Bearcreek platform, which integrates packet forwarding with network I/O virtualization aware silicon.

Figure 2:
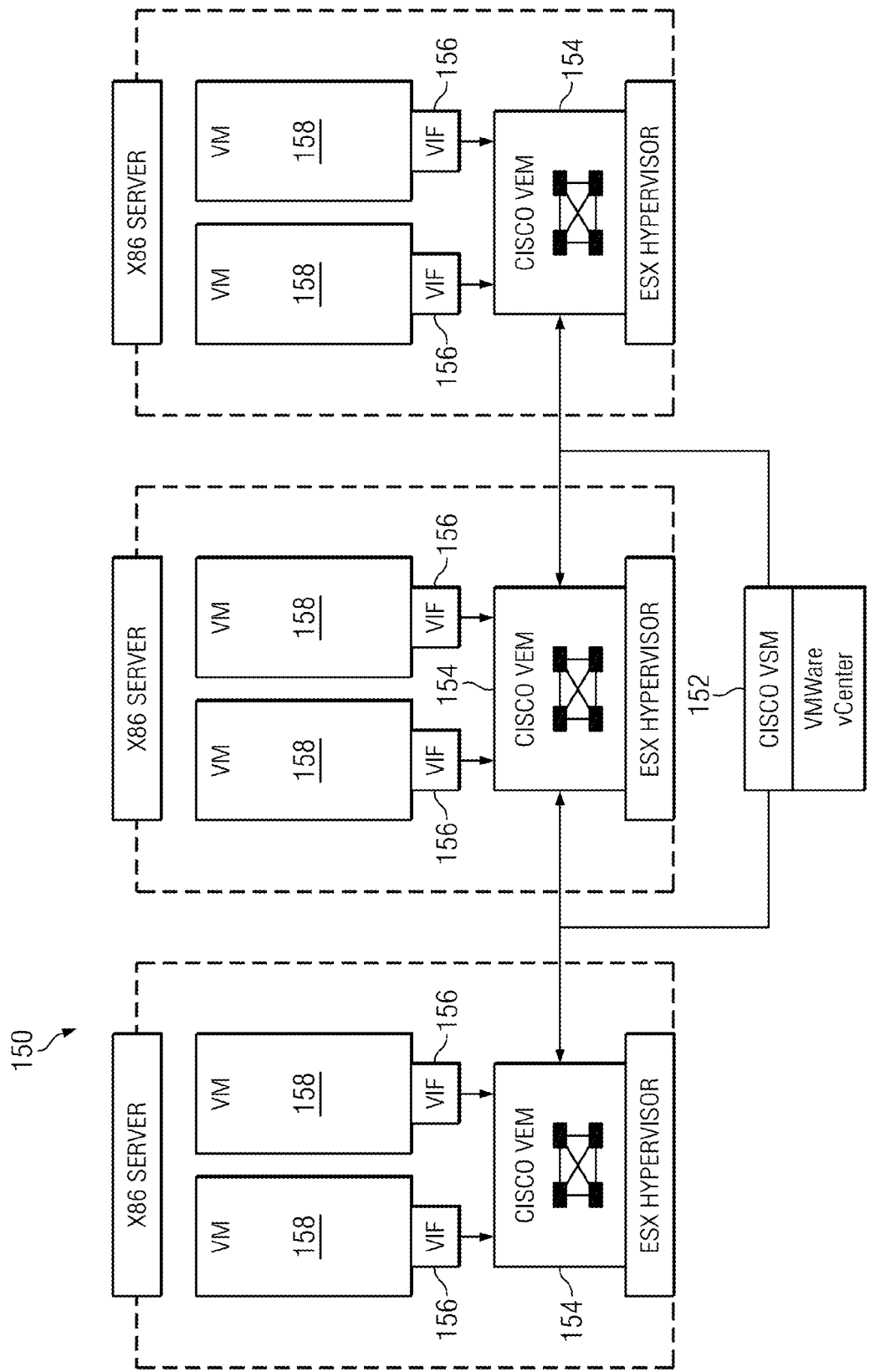
FIG. 2 illustrates a prior Nexus 1000v virtual switch architecture.

FIG. 2 illustrates a block diagram of a prior art Cisco® Nexus 1000V system 150, which is a part of a virtual machine internetworking aware external L2 switch solution. System 150 is a distributed switch (DVS) solution that is virtualization environment aware. It decouples the switch control and data planes of a vSwitch, by allowing one control plane (operations and maintenance (O&M) through VMWare vCenter) support many distributed data planes. System 150 also has a link between virtual to physical networking layers extending networking capability of server virtualization termed as VN-Link. These DVS solutions comes either embedded in the hypervisor or new class of external switch equipment that support Network Interface Virtualization (NIV).

The hypervisor embedded vSwitch includes two sub-systems. One is a Cisco® VEM 154—a data plane switch software component similar to Open vSwitch, and the other is Virtual Supervisory Module (VSM) 152. VEM 154 runs in the hypervisor context and enables switching and security features for directly hosted virtual machines. VEM 154 also provides an uplink to rest of the physical network. VEM 154 is responsible for internetworking between VMs. VSM module 152 is standalone software hosted either in an external virtual or physical appliance. Its responsibilities include switch VEM (data plane) management, monitoring, configuration and diagnostics. Virtual Interfaces (VIFs) 156 bonded to vNICs are exposed in a para-virtualized manner to the VMs 158 for faster TX/RX packet transfers. VEM 154, however, is a software solution without explicit HW offload support from NIC.

Regarding the Nexus 1000V system, an edge switch implementation on a Para virtualized I/O gets good throughput with small number of guests. With an emulated NIC to the VMs, end-I/O latency is drastically reduced. In both cases, I/O throughput decreases rapidly with the number of guests and I/O latency becomes worse affecting core fast-path packet forwarding, and does not scale with incremental guest count.

Figure 3A:
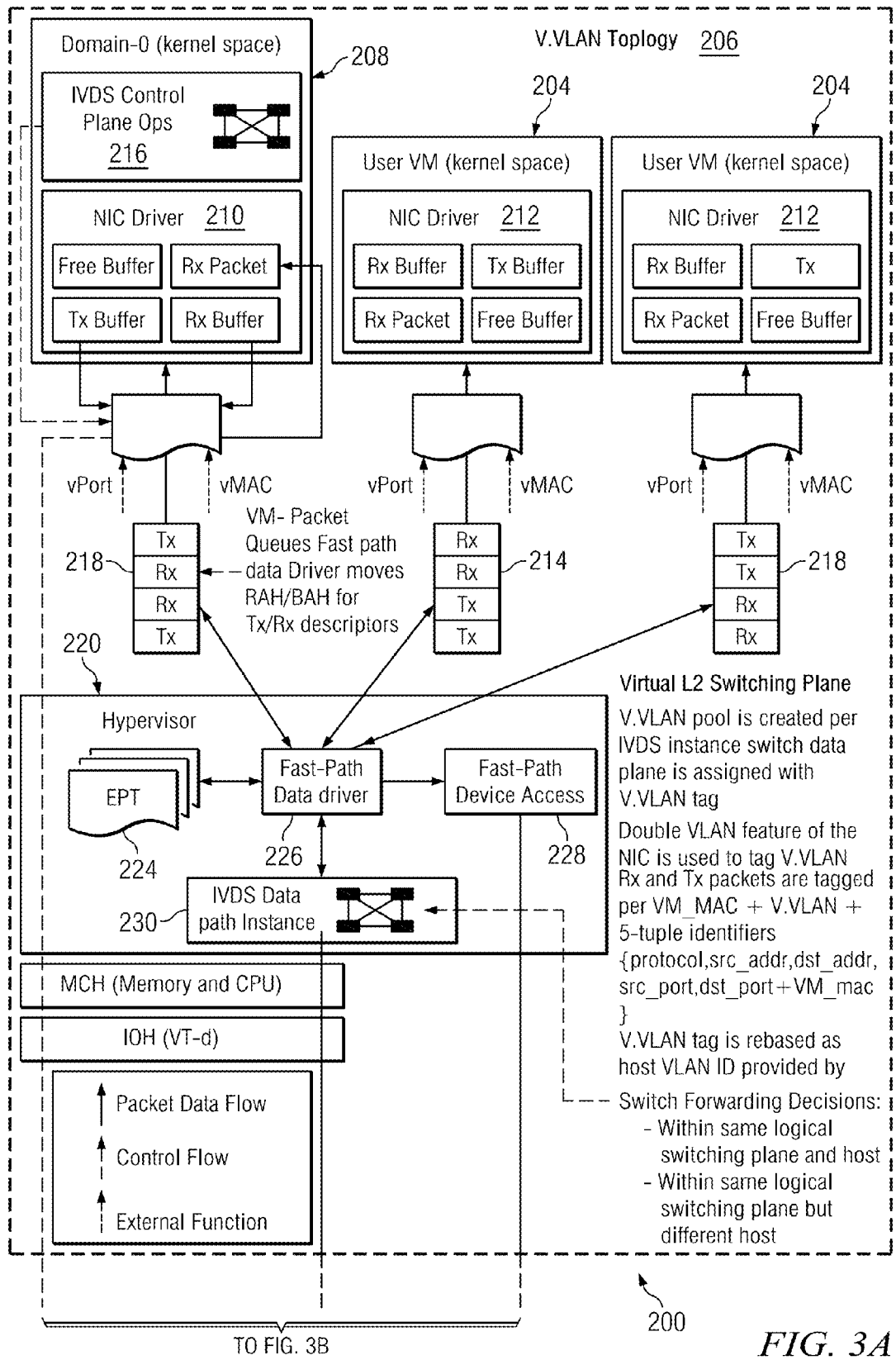
FIG. 3 illustrates a block diagram of an embodiment in-server distributed virtual Switch (IVDS)
Figure 3B:
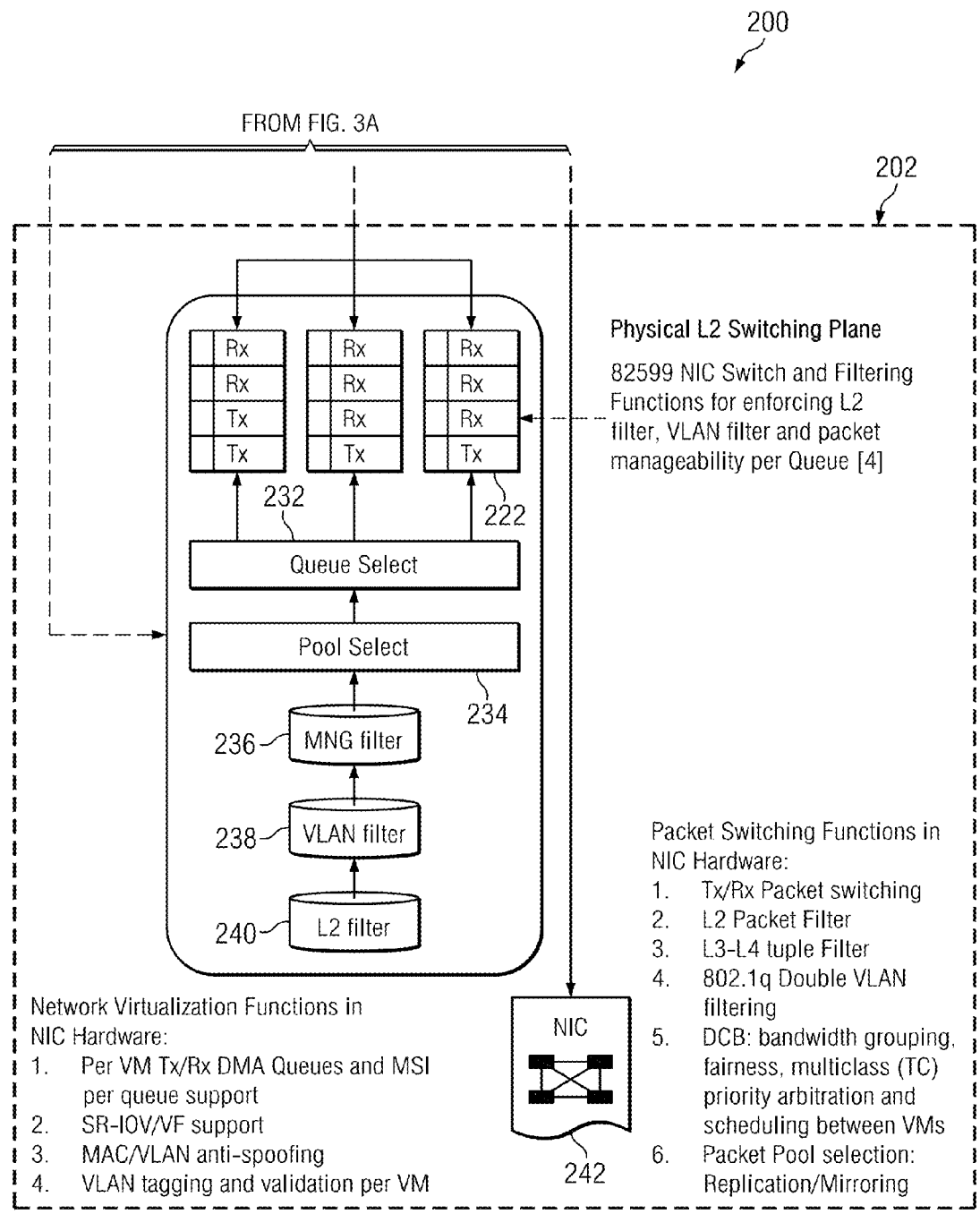

FIG. 3 illustrates a block diagram of embodiment in-server distributed virtual Switch (IVDS) 200. Here, level 2 switching is offloaded to a hardware device, for example a network interface card (NIC). In some embodiments, this is achieved via a dual view of a NIC device. First, a 'physical NIC' view 202 is used per VM 204 virtual NIC control and TX/RX activity. Second a 'switch controller' view 206 for programming of L2 switch offload separated in control and data plane operations. One embodiment architecture is based on the Xen hypervisor; however, alternative embodiments can be director toward hypervisors. NIC driver 210 in Domain 0 102 and QEMU are modified to do control operations for both control views.

In an embodiment, each user VM 204 has NIC driver 212 coupled to VM packet queues 214 in virtual L2 switching plane 206. Domain-0 has a NIC driver 210 and IVSD control plane operation block 216 which are coupled to VM packet queue 218. Hypervisor 220 serves as an interface between VM packet queues 214 and 218 and packet queues 222 present in physical L2 switching plane 202. Hypervisor 220 has extended page table (EPT) 224, fast path data driver 226, fast path device access block 228 and IVDS data path instance 230. Physical L2 switching plane 202 also has queue select functionality 232, pool select functionality 234, MNG filter 236, VLAN filter 238, and L2 filter 240. Physical L2 switching plane 202 further contains switching function 242. In an embodiment, virtual L2 switching plane 206 is implemented on a server and physical L2 switching plane is implemented in hardware interfaced to the server. This hardware can be implemented, for example in a NIC. In one embodiment the NIC is an Intel 82599, however, in alternative embodiments, other NIC hardware can be used.

In an embodiment, control operations for physical NIC views include a virtual NIC mapping PCI configuration space registers setting, an interrupt configuration, and MMIO/DMA activity. Control plane 216 for the switch controller includes programming packet switching registers as per controller capability. These include setting registers for packet switching, L2 filtering, L3-L4 five-tuple filters, packet pool selection. In one embodiment, an Intel® 82599 GBE controller with HW offload features for L2 packet switching is used. Packet switching programming is done following the manufacturers instructions.

In an embodiment, the following hardware specific instructions are made:
1. Loopback bandwidth between VM to VM traffic is kept low to facilitate and guarantee VM TX/RX traffic;
2. Most offloads provided on RX are not provided for the VM to VM loopback traffic;
3. Loopback traffic congestion may cause blockage of TX traffic;
4. The forwarding decisions are based on receive filter programming; and
5. No switching support for same traffic class.

In an embodiment, the above assumptions are hardware specific and specific adjustments may be made to IVDS software for handling inter-VM switching based on VM density. One embodiment implementation strategy of an embodiment IVDS system is to leverage open vSwitch code as basis and for limitations exposed by specific NIC controller packet switching implementation, and to use NIC switch offloading for main inter-VM switching. The NIC forwards transmit packets from a transmit queue to an RX software queue to support VM-VM communication. Transmit packets are filtered to an RX queue based on the same criteria as packets received from the wire.

In an embodiment, control plane 216 is represented as a driver function in management domain (dom-0) 208. Furthermore, control plane 216 implements the creation and manageability of:
1. Virtual VLAN (V.VLAN);
2. Virtual Ports;
3. Mapping of in-HW switch and VM assist functions such as queues by programming NIC registers;
4. IVDS configuration APIs; and
5. Distributed IVDS instances.

FIG. 4 illustrates an embodiment IVDS control plane responsibility stack 300. Stack 300 has base hardware access level 302, which includes low level mappings of NIC functions that include, for example, Interrupt, TX/RX queue and packet switching register access, and PCI-e configuration space. Functions that implement this level include a hypervisor (such as, but not limited to a Xen Hypervisor in one embodiment), MMIO/DMA/Interrupt setup for NIC, and EPT optimization Interrupt mapping for Line speed/status.

Stack 300 further has virtual switch access level 304, which includes V.VLAN Access. Included in this is tagging per host VLAN, vMAC per vNIC, vMAC function generation per physical MAC, and vNIC to vPort mapping. Level 304 also includes access and rules for data plane ACL, flow table, vPort pool, and vPort mirroring. Lastly, API access level 306 includes API Access for V.VLAN parameters, IVDS instance life cycle, vPort to vNIC assignments, vNIC and Physical NIC line-speed, status and error, ACL, vPort mirroring, and SPAN/RSPAN/ERSPAN for port monitoring.

Regarding virtual VLAN considerations, in an embodiment, a one host Virtual VLAN is under complete ownership of a host control plane. A NIC feature of double VLAN, specifically, inner-VLAN tagging is used to take ownership of inner VLAN and use it as V.VLAN tag. The control plane is responsible for inserting this value in the packets. Peer V.VLANs hosted by external IVDS instances are registered for establishing packet forwarding and flow control between VMs belonging to an external V.VLAN. Hence, additional IVDS Control plane configuration functionality is developed to maintain V.VLAN configurations and trunking.

In an embedment, V.VLAN to VLAN operates in two modes. One mode is a piggy-back mode, which allows for a separation between physical and virtual VLANs, thereby keeping existing VLAN trunking largely unchanged. For example, one VLAN could service one or more V.VLANs such that V.VLAN manageability is seamlessly integrated into existing switch management backplanes. A second mode is an independent mode, which allows V.VLANs to operate independently of physical VLAN configuration and management. Such an embodiment allows the IVDS to use only one aggregator switch and its VLAN to control all V.VLAN trunks within a network. Details of V.VLAN to physical VLAN packet flow mapping is described hereinbelow.

Regarding virtual port considerations, in a manner similar to V.VLAN definition, virtual Port (vPorts) definition and management is another core responsibility of the control plane for some embodiments. This entails setting up vPort profiles, mirroring, and mapping vPort to physical port or to another vNIC. In some embodiments, vPorts can be added or deleted as connected component (physical port or virtual interface) fails or leaves the network. Some embodiment solutions assume that a physical NIC has offloading support for port mirroring for replicating network traffic per VLAN, or physical port. In some cases, NICs do not have a concept of V.VLAN and Virtual Ports, so mirroring of a virtual port or the entire V.VLAN traffic is implemented in the software and hardware, so offloading is not employed in some cases. In one embodiment, an addendum to the IEEE 802.1Q is used to accommodate in-server bridge/switch V.VLAN behavior to accommodate real-life VM switching.

In one embedment, in-hardware switch and VM Queue assist functions are mapped. Here, the IVDS control plane is responsible for not only setting up and programming standard I/O PCI configuration, interrupt vector assignments, MMIO/DMA memory region setup functions for TX/RX queue filters, but also IVDS instance creation, programming of registers for VLAN properties such as double-VLAN, VLAN groups, and an L2 filter, for example. Furthermore, the IVDS control plane can be responsible for RX switching including packet forwarding to pools and packet mirroring, as well as TX switching including VM to VM per V.VLAN packet forwarding.

FIG. 5 illustrates an embodiment control plane—hardware functional flow 330. Regarding virtual ports, to perform virtual MAC pool assignments to the VMs and to setup communication conduits for external IVDS instances, a virtual MAC pool is created as part of RMAG—Random MAC Address Generator 332. This functionality is implemented in an embodiment Hypervisor-based driver, which is responsible for the programming and handling of VM specific queue TX/RX activity. These MAC addresses can be assigned to vNICs as a VM instance that comes online for the first time and would stay with VM for its life-cycle like physical machine.

FIG. 5 shows an embodiment relationship between HW NIC functions for MMIO 334, DMA 336, vMAC 338, vPort 340 and VM. In one embodiment, this aspect can leverage existing methods and techniques for directly mapping NIC HW Tx/Rx queues memory and interrupt handlers to the guests for supporting direct NIC based queue assignments to VM, as described in U.S. Provisional Application No. 61/389,071, filed on Oct. 1, 2010, entitled "Accelerated NetPath: A Novel Approach for Improving Virtualized Network Input/Output Performance Using Network Interface Card Assisted Multi-Queuing," which application is hereby incorporated herein by reference in its entirety. In an embodiment, the hypervisor based fast path device driver (FPDev) 342 is programmed and associated changes to the Xen (or other hypervisor) device model are made.

Figure 6:
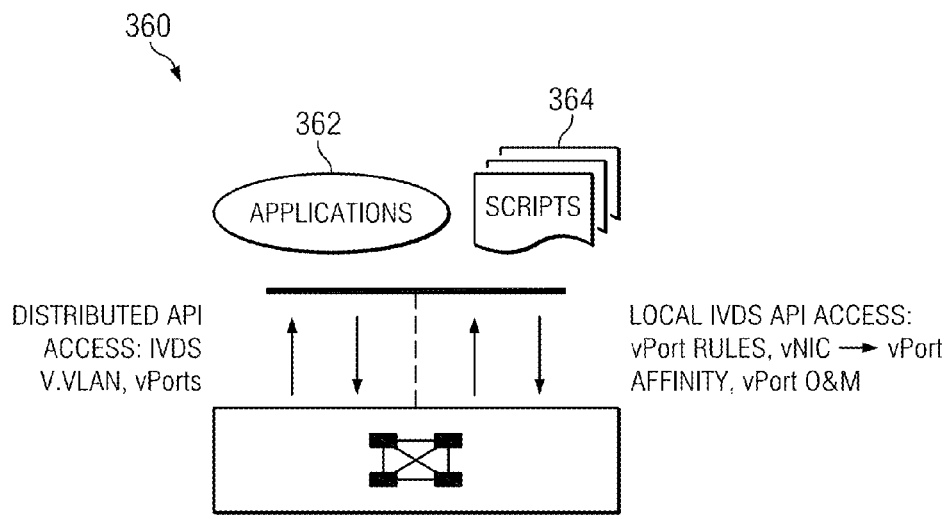
FIG. 6 illustrates an embodiment IVDS API responsibility stack.

In an embodiment, a control plane API façade is responsible for exposing remote manageability and distributed V.VLAN configurability, for example, a mechanism for programming inner VLAN feature for setting up V.VLAN affinity (i.e. how many number of peer V.VLAN can be registered with each host IVDS instance), getting IVDS instance information per physical NIC, getting and setting of vPort configuration information such as vPort to vNIC bindings, vPort rules, vPort Pools shared across peer IVDS, O&M access for statistical information about RX/TX counters, maximum transmission units (MTU), error counters, and adding and removing of vPorts, vNIC vMAC configurations. FIG. 6 illustrates an embodiment IVDS API responsibility stack 360. In embodiment, APIs can be script 364 or application 362 compatible.

Figure 7:
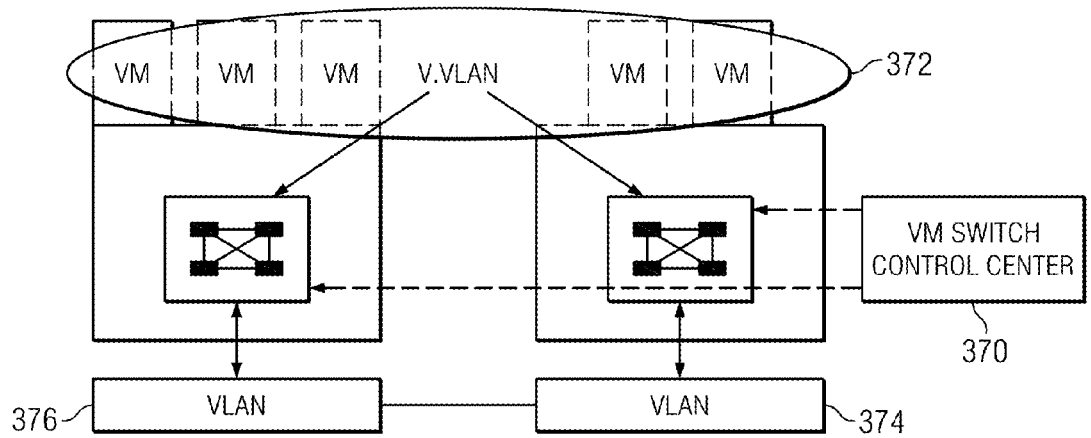
FIG. 7 illustrates an embodiment structure in which a single V.VLAN is a part of multiple IVDS instances and spans multiple underlying VLANs.

The distributed property of IVDS to include remote VM to V.VLAN is shown in FIG. 7. In some embodiments, a distributed IVDS configuration is used. This property of an IVDS instance is configured during a VM specific V.VLAN allocation. By default, all IVDS instances bear physical server and VLAN locale. This means that IVDS can be configured to inter-network VMs on same machine and with its own V.VLAN context. In a more advanced scenario, the IVDS can be configured across physical machines and include VMs in its V.VLAN context. In one embodiment, registration of pair {VM, vNIC} is performed as a part of VM commissioning enforced during VM boot or externally managed V.LAN allocations using VM Control Center application 370. In an embodiment, the IVDS control plane software maintains a table where {V.VLAN_ID, vMac, vPort, physical server MAC} bindings are retained. This information is used during packet forwarding and VM live migration scenarios. Note that there are {V.VLAN→VLAN, Host} per VM possibilities in a distributed IVDS configuration. One embodiment approach suggests that all combinations could converge to single V.VLAN for ease of VM inter-networking. This embodiment case is described below.

In one embodiment, a single V.VLAN 372 is a part of multiple IVDS instances and spans multiple underlying VLANs 374 and 376, as illustrated in FIG. 7. Furthermore, IVDS on a host include VM from separate host (V.VLAN). Packets from VMs from a remote host have their own {V.VLAN, VLAN and physical MAC} values. To simplify deployments, VM control center 370 normalizes V.VLAN configurations to single VLAN per VM set and register V.VLAN value for a remote VM in the flow table. The IVDS then issues an add V.VLAN request so this becomes a number one configuration—a single VLAN across physical VLANs and hosts.

In an embodiment, the IVDS data plane is responsible for all L2 packet switching: bridge packet ingress, forwarding, egress, and switch learning activities. In one embodiment, a logical plane to data plane is classified into a virtual (logical) networking plane and physical L2 networking plane, such that most of the data plane packet switching and V.VLAN packing responsibility is delegated to the hardware.

Regarding IVDS V.VLAN tagging, trunk, and switching behavior, an IVDS instance is created with affinity to a single IEEE 802.1Q compliant physical VLAN. This affinity includes a concept of Virtual VLAN or V.VLAN. In an embodiment, IVDS assumes hardware support for tagging VM-based virtual networks, also known as V.VLAN, instead of requiring external L2 network equipment to enforce virtual bridging (such as VEB). In some embodiments, IVDS data plane software is responsible for maintaining appropriate feature sets needed for V.VLAN programming and subsequent trunking between V.VLANs and V.VLAN to VLAN.

In one specific embedment, the IVDS data plane software uses inner VLAN tagging that is available on the 82599 NIC. The 82599 NIC supports a packet transmit/receive mode where all packets have one additional VLAN tag in addition to regular tagging. The IVDS data plane software assigns a unique V.VLAN 12-bit tag value to per each IVDS instance. This value is packed along with packet Rx/TX activity as a HW offload. In some embodiments, the IVDS explicitly handles RX packets with no V.VLAN tag even if the NIC is enabled to receive packets in such a mode. Such cases include, for example, flow/priority control packets, and IVDS data plane takes appropriate measures to handle them gracefully.

Figure 8:
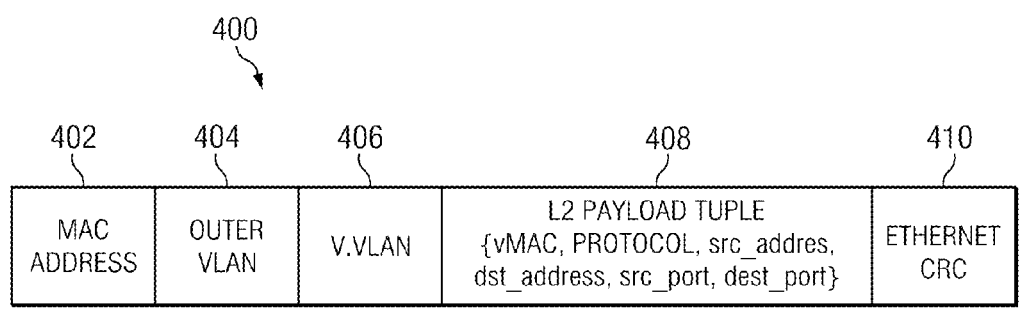
FIG. 8 illustrates an embodiment packet header.

Embodiment packet header 400 having V.VLAN packing on a TX frame is illustrated in FIG. 8. Header 400 has MAC address 402, outer VLAN designator 404, V.VLAN designator 406, L2 payload tuple 408 and CRC 410. In an embodiment, L2 payload tuple 408 includes variables vMAC, Protocol, src_addres, dst_address, src_port, and dest_port. This frame format can be used, for example, by the Intel 82599 NIC, or by NICs from other vendors. Alternatively, other formats and or L2 payload tuple variables can be used.

Figure 9:
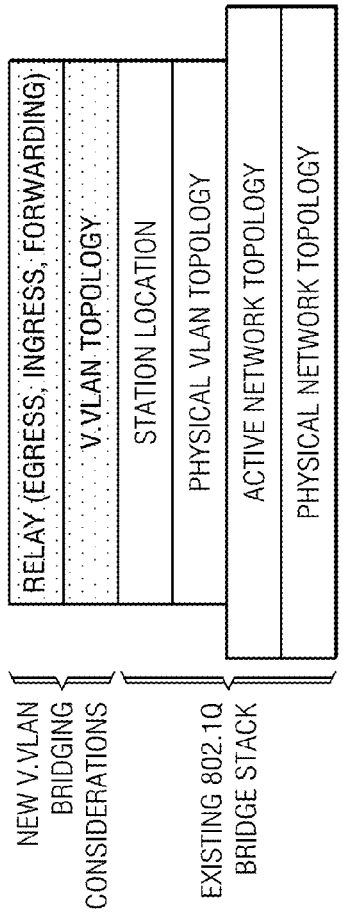
FIG. 9 illustrates an embodiment extension to IEEE 802.1Q.

In an embodiment, V.VLAN trunking is ability for providing switch functionality across VMs within a V.VLAN and work in conjunction with V.VLAN to physical VLAN as well as physical VLAN to V.VLAN forwarding plane. One embodiment IVDS data plane implementation provides appropriate software handlers to channel above transitions. V.VLAN trunking can co-exist on top existing bridging facilitated by IEEE 802.1Q shown in FIG. 9. In an embodiment, a V.VLAN topology layer and a relay (egress, ingress and forwarding) layer is used on top of the existing an IEEE 802.1Q VLAN bridging function to support Virtual VLANs. Given that flow table formats are network vendor proprietary in many cases, in one embodiment, a Huawei specific flow-table format is used along with associated packet forwarding with addition of network virtualization considerations. Alternatively, other flow-table formats can be used, for example, pre-defined flow-table data structures used to store flow table entries exposed by specific NIC vendor implementation, such as additional per queue-filtering rules, number of rules per TX/RX, active vs. passive flow division (in-HW flow-table entries and in-SW flow-table entries support) etc. More, specifically, a tuple identified as IVDS VLAN ID+{extended L2 payload} is used. In one embodiment, an extended L2 payload has six tuple bits for packet switching to the virtual network plane. The flow identification involves ability to forward physical ingress/egress packets to or from appropriate VLAN to V.VLAN. In an embodiment, a two-step process is used.

In the first step, ingress packet (RX) switching from physical VLAN topology has a conventional frame format with V.VLAN payload information as part of L2 payload. Physical NIC L2 VLAN filter offload function strips the VLAN and present V.VLAN based frame to IVDS data plane instance. In some embodiments, the IVDS control plane software instance already establishes appropriate VLAN filter rules by programming 82599 NIC registers based on {V.VLAN→VLAN} flow classification. This way, unintended {VLAN→V.VLAN} is dropped from moving up the HW filter chain. FIG. 3 illustrates filter support within the 82599 NIC.

In the second step, Egress (TX) packets switching follow two possible paths. One path is vNIC→vPort→V.VLAN→VLAN/vPort based packet replication via physical NIC pools. The other path is vNIC→vPort→V.VLAN→Loop back.

In embodiments, IVDS virtual packet to physical packet forwarding within an edge switch may involve the mapping of the following stages:
  a. port specific virtual context mapping of incoming VM packet;
  b. make V.VLAN specific decision;
  c. map V.VLAN context to VLAN (physical) context; and
  d. Forward packet as per physical forwarding constraints.
In one embodiment, only V.VLAN specific logical bindings (VM {vNIC→vPort→V.VLAN tag}) are processed in the IVDS data plane, and stages b, c, d are directly offloaded to the physical NIC switch control functions to yield better edge switch performance.

Figure 10:
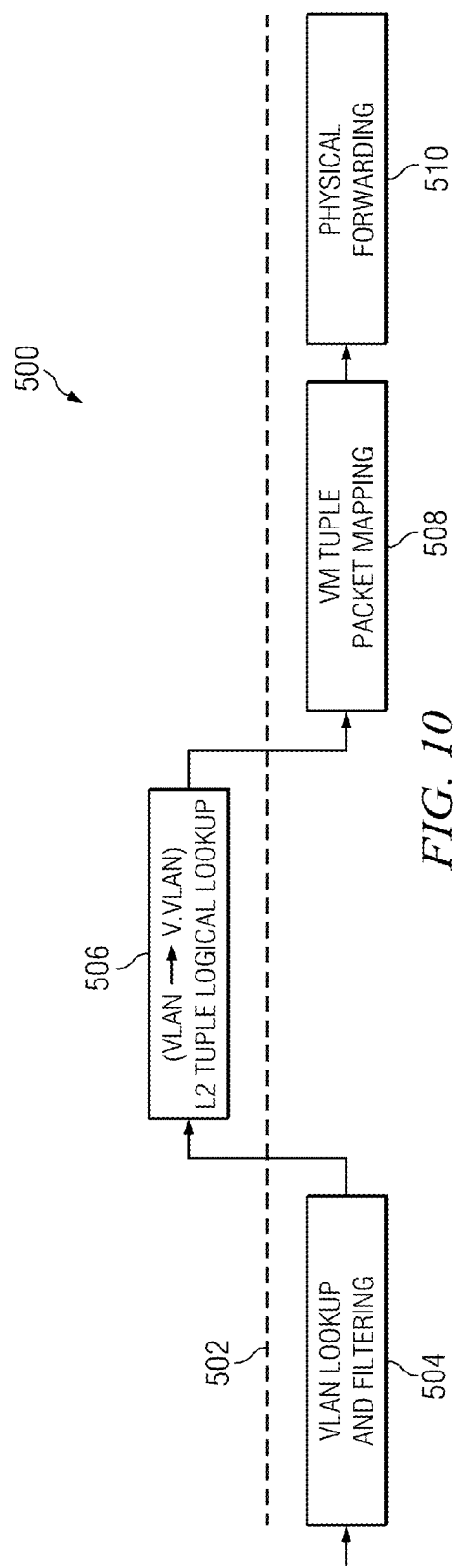
FIG. 10 illustrates an embodiment packet forwarding scheme.

In an embodiment, packet forwarding is performed using IVDS virtual to physical forwarding 500 as shown in FIG. 10. First, VLAN lookup and filtering is performed by the physical switching plane in step 504. Next, in step 506, the virtual switching plane performs VLAN to V.VLAN L2 tuple logical lookup. Dotted line 502 represents the virtual to physical boundary. Next, VM tuple packet mapping and physical forwarding is performed in steps 508 and 510, respectively in the physical switching plane. In embodiments, the physical switching plane can be implemented by a NIC and the virtual switching plane is implemented by a program running on a server.

Regarding packet TX/RX queues and network flow, fast path queue memory mappings are handled within a hypervisor driver in one embodiment. Both drivers see the device register set, control structures etc. In one embodiment, up to three context switches are used for RX/TX DMA transfer, including, for example, hypervisor, kernel0 & user copy. In some embodiments, this behavior is consistent with what is described in *Virtualizing the Network Forwarding Plane*.

Figure 11:
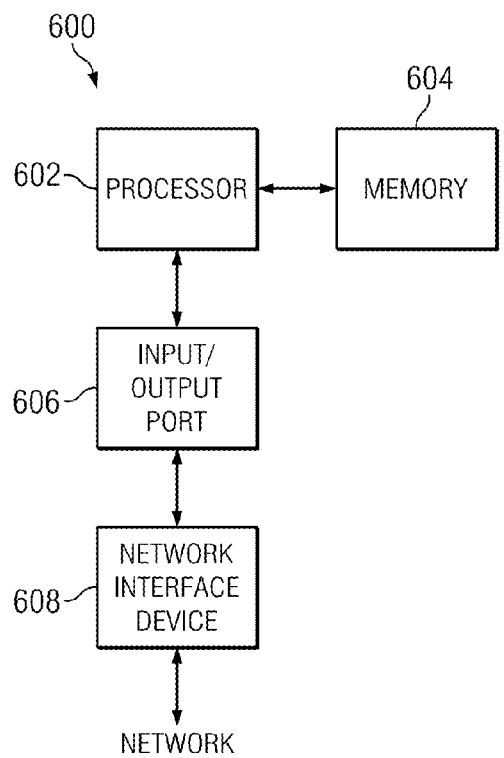
FIG. 11 illustrates an embodiment processing system.

FIG. 11 illustrates a processing system 600 that can be utilized to implement methods of the present invention. In this case, the main processing is performed in by processor 602, which can be a microprocessor, digital signal processor or any other appropriate processing device. In some embodiments processor 602 can be implemented by a plurality of processors. Program code (e.g., the code implementing the algorithms disclosed above) and data can be stored in memory 604. The memory can be local memory such as DRAM or mass storage such as a hard drive, optical drive or other storage (which may be local or remote). While the memory is illustrated functionally with a single block, it is understood that one or more hardware blocks can be used to implement this function.

In one embodiment, the processor can be used to implement various some or all of the units shown in FIG. 11. For example, the processor can serve as a specific functional unit at different times to implement the subtasks involved in performing the techniques of the present invention. Alternatively, different hardware blocks (e.g., the same as or different than the processor) can be used to perform different functions. In other embodiments, some subtasks are performed by the processor while others are performed using a separate circuitry.

FIG. 11 also illustrates I/O port 606 which is used as an interface to network interface device. Network interface device 608 can be implemented as a network interface card (NIC) as described and configured according to the embodiments described above, and provides an interface to a network.

Embodiment systems and methods can be used, for example, in VM Live Migration and network context preservation. For example, the workload balancing and some HA scenarios in Cloud IaaS environment imply hypervisors employing VM live migrations across physical networks. In a typical Live Migration, VM specific CPU, memory and some I/O device "slicing" of the physical resources are carefully transitioned to maintain correct kernel and user space operational contexts and consistency. In some cases, however, network connections are reset due to live migration process. This includes resetting of vNIC to VLAN bindings. Embodiment IVDS implementations, however, cause minimal disruption to network forwarding connection state as VM network dependence (through vNICs and vMacs/vPorts) is per V.VLAN context, and not physical VLAN, which could span physical servers even physical networks. Here, the V.VLAN context is preserved for a specific migrating VM similar to preservation of compute resource contexts. This is because, an IVDS instance on a source physical server (where VM is hosted) can ensure vMac, which gets appropriately transferred to target physical server slave-IVDS instances that ensure the V.VLAN context across physical networks. As such, an IVDS port to vNIC connection is re-established before the VM compute context is restored. This prior restoration of IVDS vMAC context will cause the VM network stack to re-establish a network link as it happens with a physical machine when a network cable is removed and plugged in. Such an embodiment use case leverages 'single V.VLAN' normalization performed as part of VM network planning activity.

Furthermore, embodiment systems and methods can be used in distributed, Virtualization-aware Network Architectures. Limitations with current VLAN considerations will be exposed as scaling of VMs per physical host pushes to the limit and VM inter-networking becomes more real-life than just additional requirement on top of existing VLAN. Embodiment IVDS systems and methods and the concept of V.VLAN extends the number of virtual VLANs by $(2^{12})^{12}$, which produces a very large tagging limit. Some embodiment IVDS V.VLAN schemes not only facilitate physical locale-independent inter-VM switching, but also extend current "network groups" multi-tenancy supported by VLANs through IEEE 802.1Q and 802.1QinQ.

With regard to analytics & security platform for virtualized environments, embodiment IVDS systems and methods through the exposed API's can be a platform for hosting security as well as analytics mechanisms such as DPI/BI within virtualized environments. Here, physical network plane security features such as intrusion detection, packet inspection are extended and are moved-up the stack in the virtualized environments. Furthermore, cloud analytics is another area requiring platform presence for virtualized networking plane created by Cloud IaaS.

Embodiment IVDS systems and methods can be used to extend the power of consolidation and isolation popularized by Server Virtualization to physical L2 switching plane. Some embodiment IVDS Scheme is simple enough to run on an existing IP network and is less intrusive to physical network site planning. Embodiment IVDS systems and methods enable a packet switching architecture for VM enabled environments on top of existing HW virtualization offloads for networking features provided by Intel® NICs or Intel® DPDK or Intel's next generation Bearcreek/Forestcreek data plane platforms or other platforms. Furthermore, an embodiment modification to the IEEE 802.1Q VLAN standard to allow for the inclusion of Virtualized VLANs can facilitate the extending the reach of a VLAN reach into a Virtualized Network.

In an embodiment, Virtual VLANs (V.VLAN) methods and techniques are used to isolate Virtual Machines at network layer-2, maintaining this isolation regardless of physical hardware and the locale of the Virtual Machines. In some embodiments, these V.VLANs use a Ethernet frame tagging technique that embodies a distributed V.VLAN interface using inner-VLAN tagging support by NIC such as Intel 82576/82599. In some embodiments, modified Ethernet frame Egress/Ingress operation is used on-top of existing IEEE 802.1Q standard for VLAN. Furthermore, some embodiment V.VLAN create an L2 fabric between Virtual and Physical network boundaries using a flattened view of Layer-2 network without modification of existing layer-2 switches, for example, in a datacenter.

Figure 12:
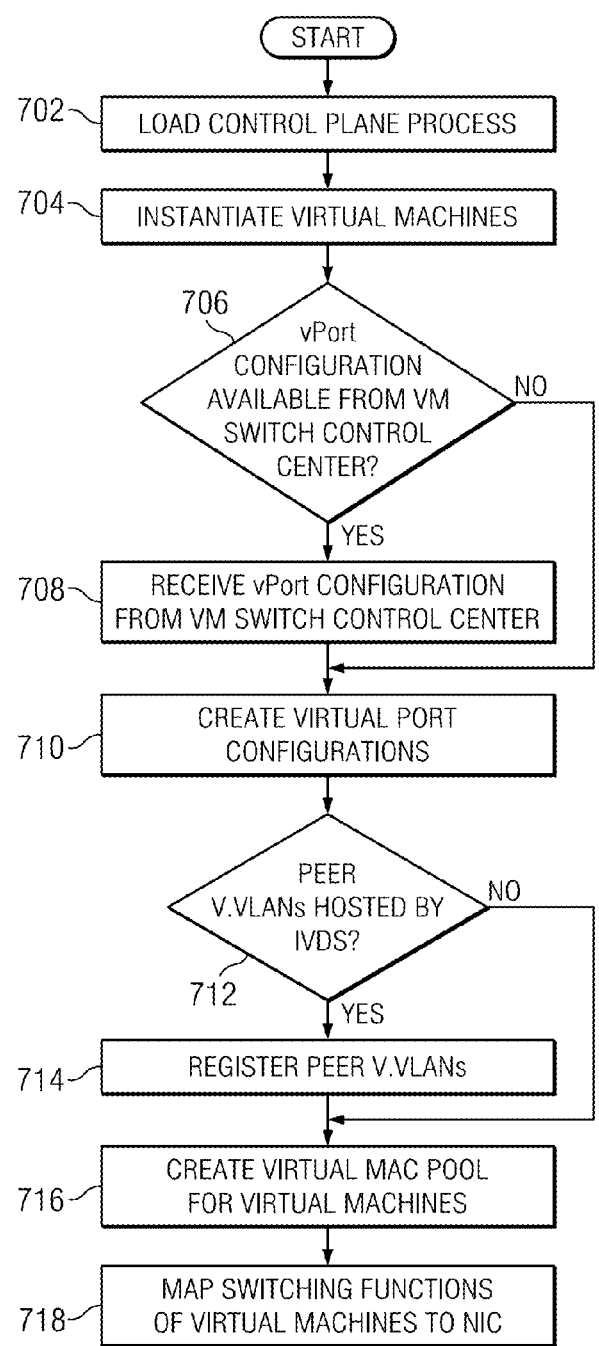
FIG. 12 illustrates a flowchart of an embodiment method.

FIG. 12 illustrates flowchart 700 illustrating an embodiment method that can be performed by an embodiment system, such as a processor. A control plane process is loaded in step 702, and virtual machines are instantiated in step 704. If vPort configurations are available from a VM switch control center (step 706), the vPort configurations are received from the VM switch control center (step 708). In one embodiment, the control plane process runs an API that receives these vPort configurations. Next, in step 710, the virtual port configurations are created. In some embodiments, a determination is made whether peer V.VLANs are hosted by the IVDS (step 712). If so, these V.VLANs are registered in step 714. In step 716, a virtual MAC pool is created for the virtual machines, and in step 718, the switching functions of the virtual machines are mapped to the NIC. The order of embodiment process 700 may proceed according to the order of the flowchart shown in the figure. Alternatively, the steps of process 700 may proceed concurrently, or in a different order depending on the particular system and its specifications.

In an embodiment, a data processing system a data processing system includes a processor, a memory coupled to the processor, and an interface port configured to be coupled to a hardware network interface device, wherein the processor is configured to run a process that maps network switching functions of each of a plurality of virtual machines to the hardware network interface device. In an embodiment, the processor is further configured to run the plurality of virtual machines. In some embodiments, the process that maps network switching functions is a hypervisor that, for example, can transfer data between packet queues associated with each of the plurality of virtual machines, and packet queues within the hardware network interface via the interface port. The hypervisor may include a fast-path data driver coupled to an in-server distributed virtual switch (IVDS), and the fast-path data driver may be coupled to the packet queues associated with each of the plurality of virtual machines. In some embodiments, the IVDS is configured to input and output data to the packet queues within the hardware network interface via the interface port. In some embodiments, the system further includes the hardware network interface device, which can be implemented using, for example, a hardware network interface device is a network interface card (NIC). In embodiments, switching functions of the virtual machines are offloaded from a processor of the server, and network traffic of the virtual machines are isolated from one another.

In some embodiments, the processor is further configured to run a control plane operation for the hardware network interface device. The control plane may be configured to set registers that control functionality of at least one of packet switching, level 2 filtering, and packet pool selection on the hardware network interface device. In some cases the processor is further configured to tag data packets with a virtual VLAN tag.

In an embodiment, a hardware network interface device includes a first interface configured to be coupled to a sever via a server interface, and a plurality of transmit and receive queues configured to exchange data with a data plane running on the server a computer interface via the server interface. The hardware network interface device can be configured to perform a plurality of network switching functions that are controlled by the server via the server interface. In some embodiments, the plurality of network switching functions is controlled a control plane running on the server. The switching functions may include at least one of, TX/RX packet switching, L2 packet filtering, L3-L4 tuple filtering, and packet pool selection. In some embodiments the hardware network interface device may be implemented by a network interface card (NIC). Some embodiment hardware network interface device may also include a L2 filter circuit, and a VLAN filter circuit.

In some embodiments, the hardware network interface device is further configured to perform a plurality of network virtualization functions including at least one of virtual machine TX/RX direct memory access queue and MSI per queue support, single root I/O virtualization/VF PCI Virtual Functions support, and virtual local area network (VLAN) tagging and validation per virtual machine.

In an embodiment, a method of operating a server includes running a process on a processor that maps network switching functions of each of a plurality of virtual machines to a hardware network interface device via an interface port. The method may also include running the plurality of virtual machines on the processor. The process that that maps network switching functions may include running a hypervisor. In some embodiments, the method also includes transferring data between packet queues associated with each of the plurality of virtual machines, and packet queues within the hardware network interface device via the interface port.

In an embodiment, the method also includes running a fast-path data driver transmitting and receiving data to and from the packet queues associated with each of the plurality of virtual machines, and transmitting and receiving data to and from the packet queues within the hardware network interface via the interface port. In some embodiments, the transmitting and receiving data to and from the packet queues associated with each of the plurality of virtual machines may be performed by a fast path data driver operating on the processor, and the transmitting and receiving data to and from the packet queues within the hardware network interface via the interface port may be performed by an in-server distributed virtual switch (IVDS) operating on the processor in communication with the fast path data driver.

In an embodiment, the method also includes running a control plane to control parameters on the hardware network interface device via the interface port. Running the control plane may also include controlling functionality of at least one of packet switching, level 2 filtering, and packet pool selection on the hardware network interface device. In some embodiments, the method further includes running a process on the processor that tags data packets with a virtual VLAN tag.

In an embodiment, a method of operating a server system includes loading a control plane process, instantiating a plurality of virtual machines, creating a virtual port configuration for each of the plurality of virtual machines, and mapping network switching functions of each of a plurality of virtual machines to the hardware network interface device via the interface port. In some embodiments, the server includes at least one processor, a memory, and an interface port configured to be coupled to a hardware network interface device.

In an embodiment, the method also includes creating a virtual MAC pool, which may includes creating random MAC addresses for the plurality of virtual machines. In some embodiments, the method further includes the control plane running an API that receives virtual port (vPort) configuration information from a VM switch control center. The vPort configuration information may include at least one of vPort to vNIC bindings, vPort rules, vPort Pools shared across peer in-server distributed virtual switches (IVDS), operations and maintenance (O&M) access for statistical information about RX/TX counters, maximum transmission units (MTU), error counters, information pertaining to adding and removing of vPorts, and vNIC vMAC configurations. The control plane may further register peer virtual VLANs (V.VLANs) hosted by an external in-server distributed virtual switch (IVDS). In some embodiments, the V.LAN operates in a piggy-back mode maintaining separation between physical and virtual networks, while in other embodiments, the V.LAN operates in an independent mode in which the V.VLAN operates independently of physical VLAN configuration and management.

In some embodiments, the V.LAN isolates the plurality of virtual machines at network layer-2. The isolation of the plurality of virtual may be maintained regardless of physical hardware and local of the plurality of virtual machines. In an embodiment, the processor tags data packets with a virtual VLAN tag. The virtual VLAN tag may be implemented as an extension to an IEEE 802.1Q packet.

In an embodiment, a method of operating a hardware network interface device for offloading network switching functions of a plurality of virtual machines running on a server includes receiving configuration data from the server, exchanging network data of the plurality of virtual machine with a data plane of the server, performing network switching functions on the network for the plurality of virtual machines based on the received configuration data, and performing a network virtualization functions. In embodiments, network traffic of the plurality of virtual machines is isolated from each other.

Advantages of embodiments that offload processing functions related to switching include the ability to save CPU resources. Offloading processing functions can lead to lower power consumption, or to having more computing resources available, for example, to virtual machines. A further advantage includes the ability for embodiment systems to scale with incremental guest count because VM scalability is directly proportional to underlying scalability of compute and network hardware, and the ability of embodiment proposed techniques to map guest to HW functions without management domain's (dom-0) interference. Furthermore, some embodiment systems are able to leverage in hardware switch/packet processing capabilities such as multiple HW TX/RX Queues with reduced context switches in edge switch architecture thus improving I/O scalability and maintain latency promise of Virtualized Infrastructure.

A further advantage of embodiments that allow for hardware offloading for L2 packet filtering, sorting, and/or port mirroring is that the physical CPU is not required to consume extra power by running virtual switch code due to switch data plane code execution. Furthermore, embodiment systems that use L2 switch offload features scales with incremental guest count.

Further advantages of embodiments include the ability to offer industry grade switching capability and consolidate need of physical L2 switches for virtualized environments such as cloud IaaS, the ability to leverage network visualization assets in the physical NIC HW for switch data forwarding plane implementation, and the ability to partition hardware assets plane network TX/RX activity and L2 switch offload features for virtualized infrastructures. Further advantages include the ability to create an edge-switch with unique distributed VM inter-networking concept of Virtual VLAN (V.VLAN) and reduce physical L2 switching dependency for the same. Furthermore, embodiments of the present invention can facilitate VM live migration as far as virtual networking is concerned by making it transparent to physical network dependencies.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of running a plurality of virtual machines on a server, the method comprising:

mapping network switching functions of each of the plurality of virtual machines to a hardware network interface device that is separate from a processor running the plurality virtual machines on the server, wherein the network switching functions of the virtual machines are offloaded from the processor of the server, and wherein network traffic of the virtual machines are isolated from one another; and controlling parameters on the hardware network interface device via a control plane, wherein the control plane is configured to register peer virtual VLANs (V.VLANs) hosted by an external in-server distributed virtual switch (IVDS).

2. The method of claim 1, wherein mapping switching functions is performed by a hypervisor.

3. The method of claim 1, further comprising transferring data between packet queues associated with each of the plurality of virtual machines, and packet queues within the hardware network interface device via an interface port coupled between the server and the hardware network interface device.

4. The method of claim 3, further comprising:
transmitting and receiving data to and from the packet queues associated with each of the plurality of virtual machines; and
transmitting and receiving data to and from the packet queues within the hardware network interface via the interface port.

5. The method of claim 4, wherein:
the transmitting and receiving data to and from the packet queues associated with each of the plurality of virtual machines is performed by a fast path data driver; and
the transmitting and receiving data to and from the packet queues within the hardware network interface via the interface port is performed by an in-server distributed virtual switch (IVDS) in communication with the fast path data driver.

6. The method of claim 1, further comprising the control plane controlling functionality of at least one of packet switching, level 2 filtering, and packet pool selection on the hardware network interface device.

7. The method of claim 1, further comprising tagging data packets with a virtual VLAN tag.

8. A method of operating a server system for running a plurality of virtual machines, the method comprising:
loading a control plane process;
instantiating the plurality of virtual machines;
creating a virtual port configuration for each of the plurality of virtual machines; and
mapping network switching functions of each of a plurality of virtual machines to a hardware network interface device that is separate from a processor running the plurality of virtual machines on the server, wherein the switching functions are offloaded from the server, wherein traffic of the plurality of virtual machines is isolated from one another, and wherein the control plane further registers peer virtual VLANs (V.VLANs) hosted by an external in-server distributed virtual switch (IVDS).

9. The method of claim 8, further comprising, creating a virtual MAC pool, creating the virtual MAC pool comprising creating random MAC addresses for the plurality of virtual machines.

10. The method of claim 8, further comprising the control plane running an API that receives virtual port (vPort) configuration information from a VM switch control center.

11. The method of claim 10, wherein the vPort configuration information comprises at least one of:
vPort to vNIC bindings;
vPort rules;
vPort Pools shared across peer in-server distributed virtual switches (IVDS);
operations and maintenance (O&M) access for statistical information about RX/TX counters;
maximum transmission units (MTU);
error counters;
information pertaining to adding and removing of vPorts; and
vNIC vMAC configurations.

12. The method of claim 8, wherein the V.LAN operates in a piggy-back mode maintaining separation between physical and virtual networks.

13. The method of claim 8, wherein the V.LAN operates in an independent mode, wherein the V.VLAN operates independently of physical VLAN configuration and management.

14. The method of claim 8, wherein the V.LAN isolates the plurality of virtual machines at network layer-2, and wherein isolation of the plurality of virtual is maintained regardless of physical hardware and local of the plurality of virtual machines.

15. The method of claim 8, further comprising tagging data packets with a virtual VLAN tag.

16. The method of claim 15, wherein the virtual VLAN tag is implemented as an extension to an IEEE 802.1Q packet.

17. A data processing system for running a plurality of virtual machines, the data processing system comprising:
a processor;
a memory coupled to the processor; and
an interface port configured to be coupled to a hardware network interface device separate from the processor, wherein the processor is configured to run a process that maps network switching functions of each of the plurality of virtual machines to the hardware network interface device, wherein the network switching functions of the virtual machines are offloaded from the processor, wherein traffic of the plurality of virtual machines is isolated from one another, and
wherein the processor is further configured to run a control plane operation for the hardware network interface device, wherein the control plane operation is configured to register peer virtual VLANs (V.VLANs) hosted by an external in-server distributed virtual switch (IVDS).

18. The data processing system of claim 17, wherein the processor is further configured to run the plurality of virtual machines.

19. The data processing system of claim 17, wherein the process that maps network switching functions is a hypervisor.

20. The data processing system of claim 19, wherein the hypervisor transfers data between packet queues associated with each of the plurality of virtual machines, and packet queues within the hardware network interface via the interface port.

21. The data processing system of claim 20, wherein:
the hypervisor comprises a fast-path data driver coupled to an in-server distributed virtual switch (IVDS);
the fast-path data driver is coupled to the packet queues associated with each of the plurality of virtual machines; and
the IVDS is configured to input and output data to the packet queues within the hardware network interface via the interface port.

22. The data processing system of claim 20, wherein:
the hypervisor comprises a fast-path data driver configured to be coupled to a hardware switching function in the hardware network interface device; and
the fast-path data driver is coupled to the packet queues associated with each of the plurality of virtual machines.

23. The data processing system of claim 17, wherein the hardware network interface device is a network interface card (NIC).

24. The data processing system of claim 17, further comprising the hardware network interface device.

25. The data processing system of claim 17, wherein the control plane operation is configured to set registers that control functionality of at least one of packet switching, level 2 filtering, and packet pool selection on the hardware network interface device.

26. The data processing system of claim 17, wherein the processor is further configured to tag data packets with a virtual VLAN tag.

27. The method of claim 1, wherein the V.LAN operates in a piggy-back mode maintaining separation between physical and virtual networks.

28. The method of claim 1, wherein the V.LAN operates in an independent mode, and wherein the V.VLAN operates independently of physical VLAN configuration and management.

29. The method of claim 1, wherein the V.LAN isolates the plurality of virtual machines at network layer-2, and wherein isolation of the plurality of virtual is maintained regardless of physical hardware and local of the plurality of virtual machines.

30. The data processing system of claim 17, wherein the V.LAN operates in a piggy-back mode maintaining separation between physical and virtual networks.

31. The data processing system of claim 17, wherein the V.LAN operates in an independent mode, and wherein the V.VLAN operates independently of physical VLAN configuration and management.

32. The data processing system of claim 17, wherein the V.LAN isolates the plurality of virtual machines at network layer-2, and wherein isolation of the plurality of virtual is maintained regardless of physical hardware and local of the plurality of virtual machines.

\* \* \* \* \*